United States Patent [19]

Shinomiya

[11] Patent Number: 5,327,402
[45] Date of Patent: Jul. 5, 1994

[54] CLOCK SUPPLY APPARATUS
[75] Inventor: Tadanao Shinomiya, Kawasaki, Japan
[73] Assignee: Fujitsu Limited, Kawasaki, Japan
[21] Appl. No.: 55,676
[22] Filed: Apr. 30, 1993
[30] Foreign Application Priority Data
  Apr. 30, 1992 [JP] Japan .................. 4-111087
[51] Int. Cl.⁵ .............. G04C 11/00; G04C 13/00; H04J 3/06
[52] U.S. Cl. .................. 368/46; 370/100.1; 375/106
[58] Field of Search .......... 368/101, 46, 52, 107, 368/113; 364/200, 900, 569; 370/85.1, 85.6, 85.9, 100.1; 375/106

[56] References Cited
U.S. PATENT DOCUMENTS 4,866,606 9/1989 Kopetz ..................... 364/200
4,886,981 12/1989 Lentini et al. .............. 307/87
4,890,222 12/1989 Kirk ........................ 364/200
5,040,158 8/1991 Lee et al. .................. 368/10

FOREIGN PATENT DOCUMENTS
56-103386 8/1981 Japan.

Primary Examiner—Vit W. Miska

[57] ABSTRACT

A clock supply apparatus provided in each slave office, wherein a single master clock is received at a clock receiver unit; 0-system and 1-system system clocks are paired and are distributed to the transmission units at terminal ends via a plurality of duplexed clock supply routes; and multistage clock selection units are hierarchically inserted into the duplexed clock supply routes. The system-selection unit for controlling the selection of the 0-system or 1-system at each clock selection unit is given a 0-system and 1-system duplexed structure and is constituted by a system switching command unit for instructing this system-selection.

11 Claims, 18 Drawing Sheets

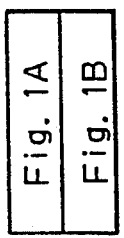
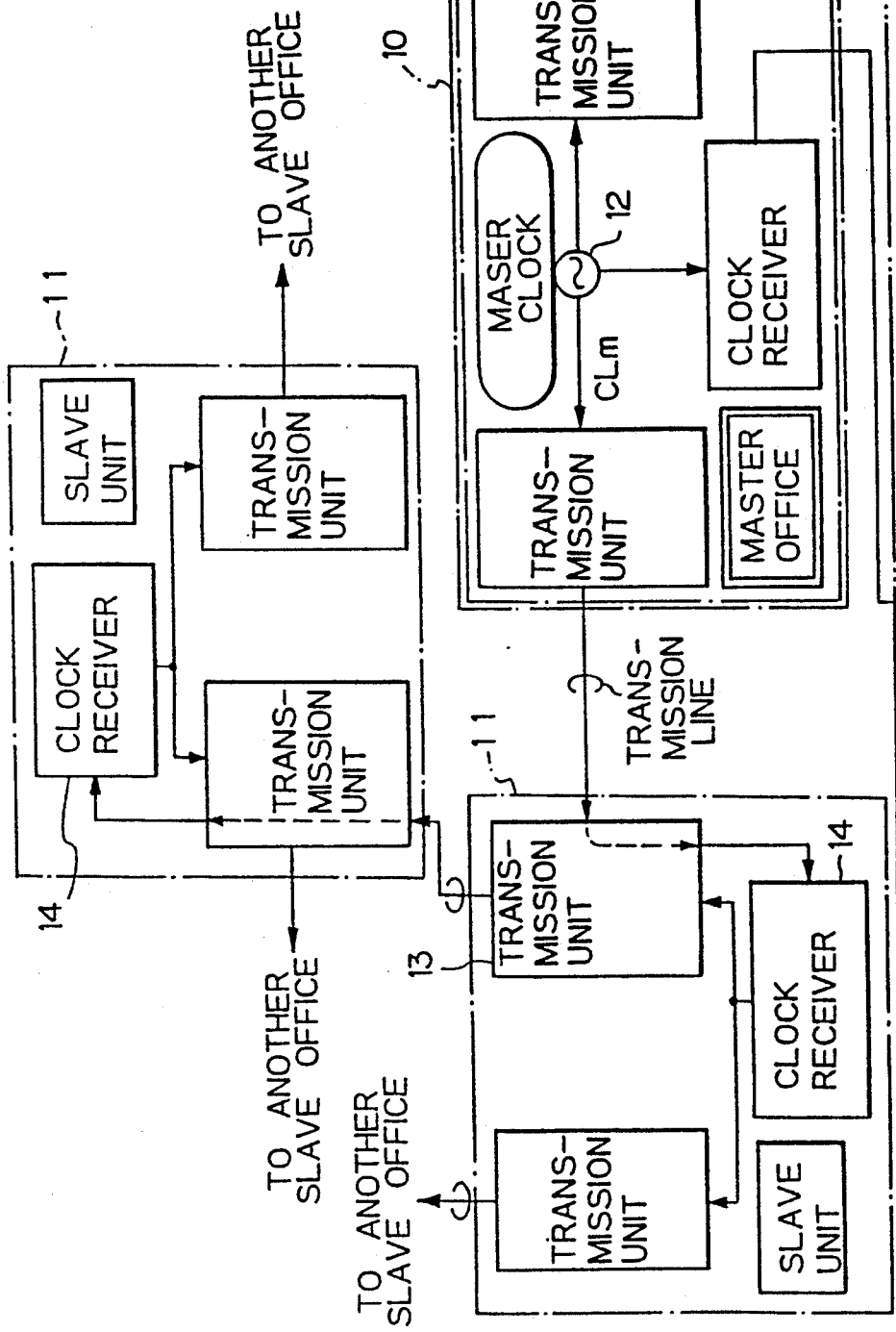
Fig. 1A

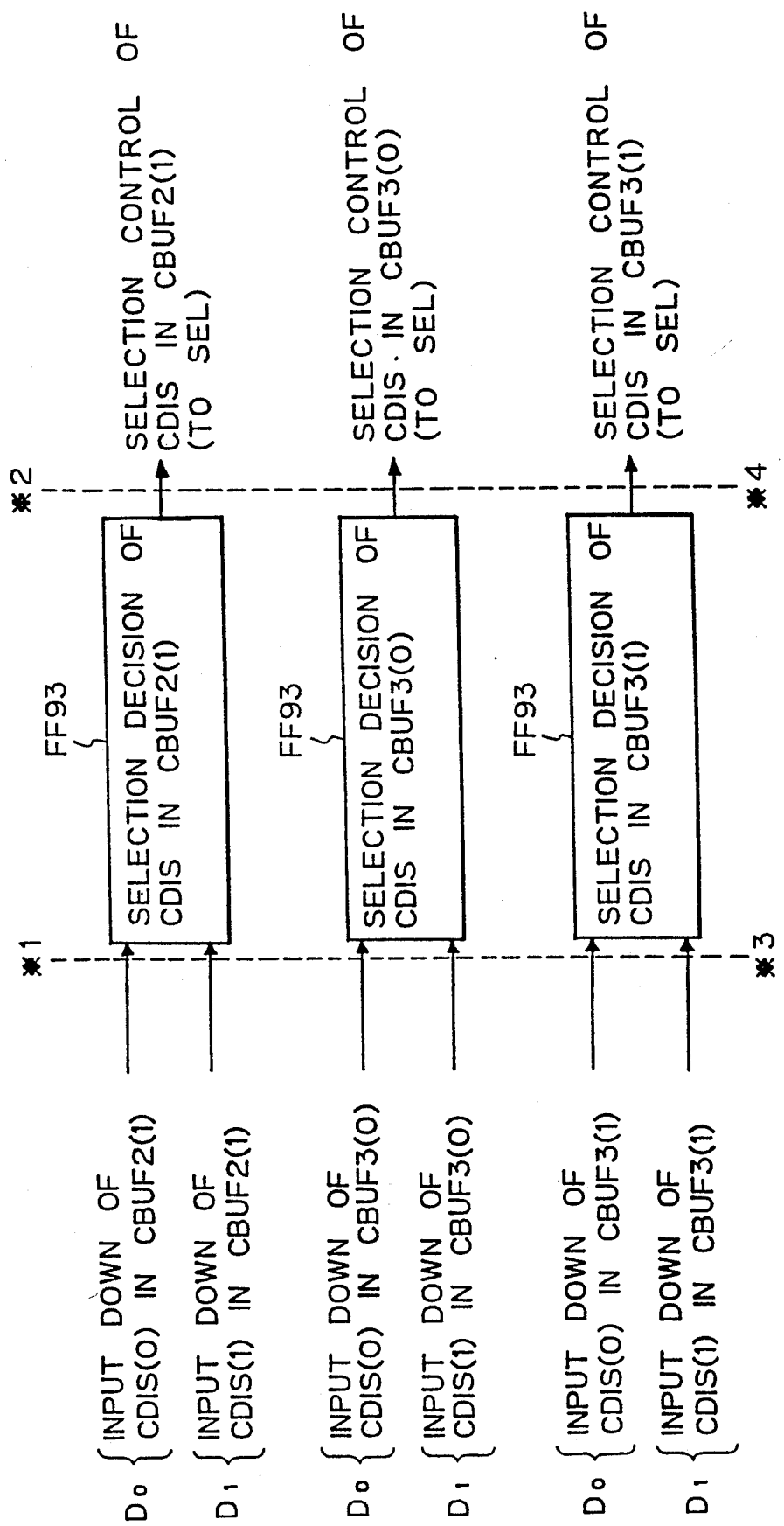

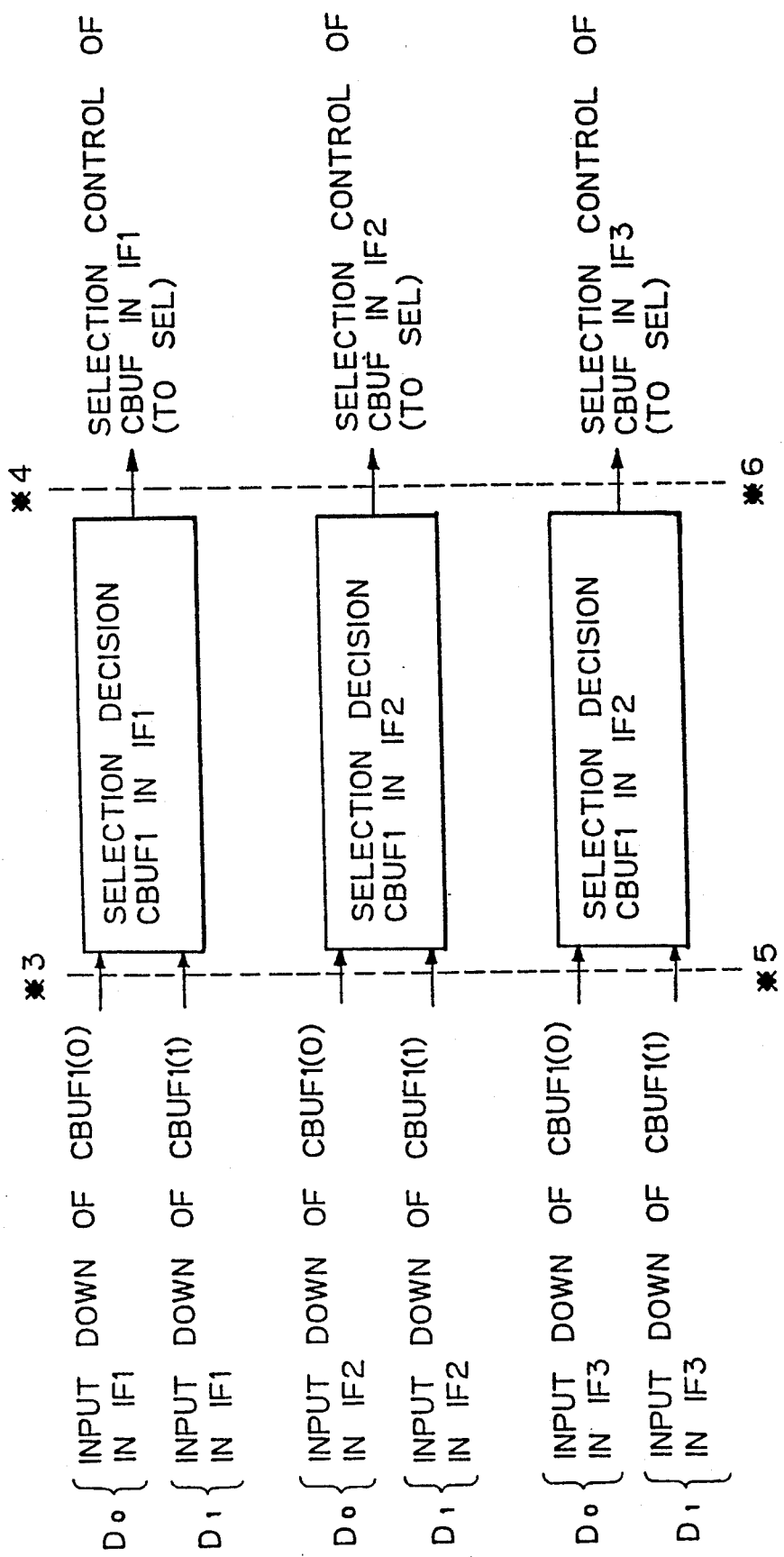

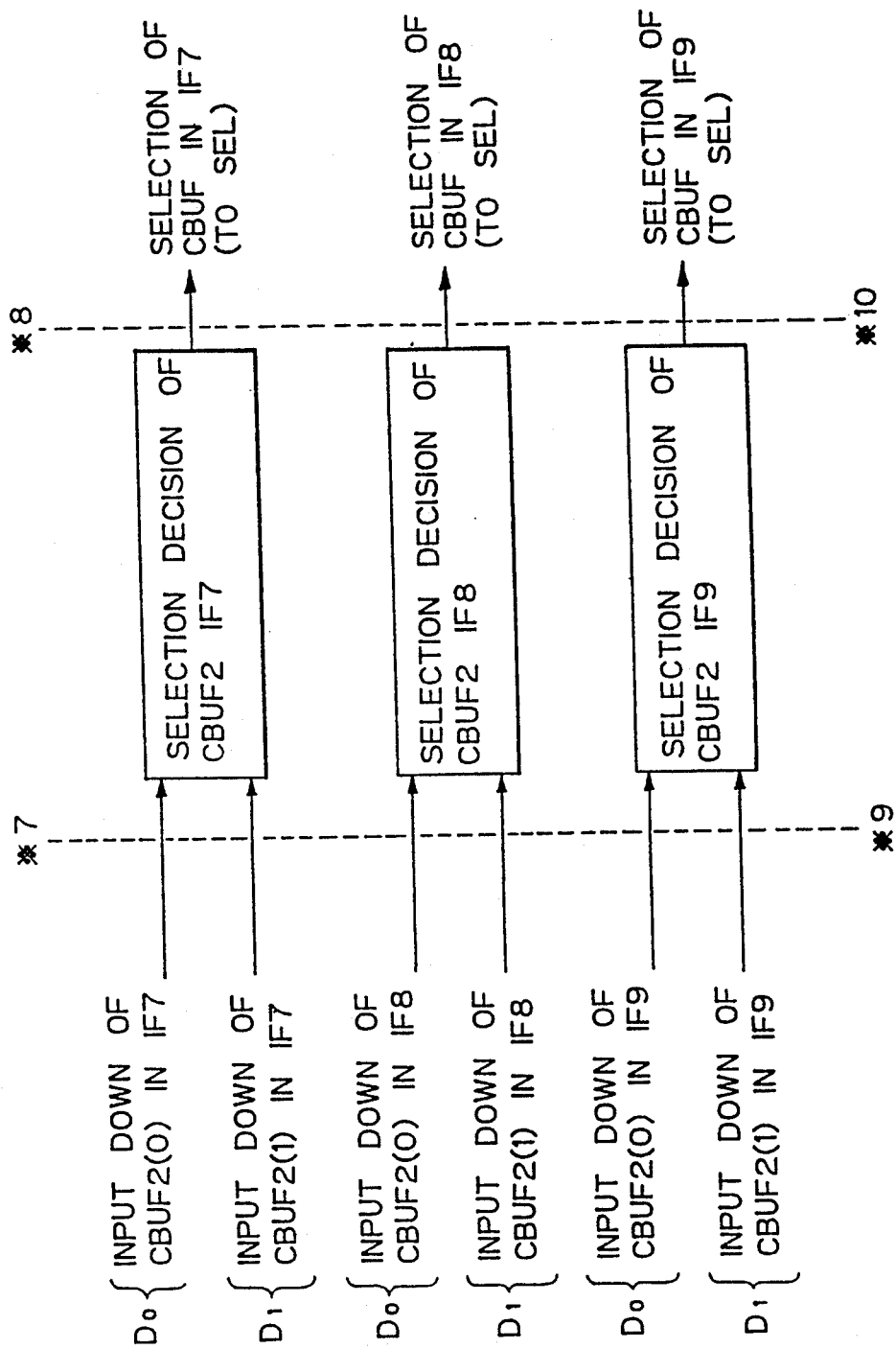

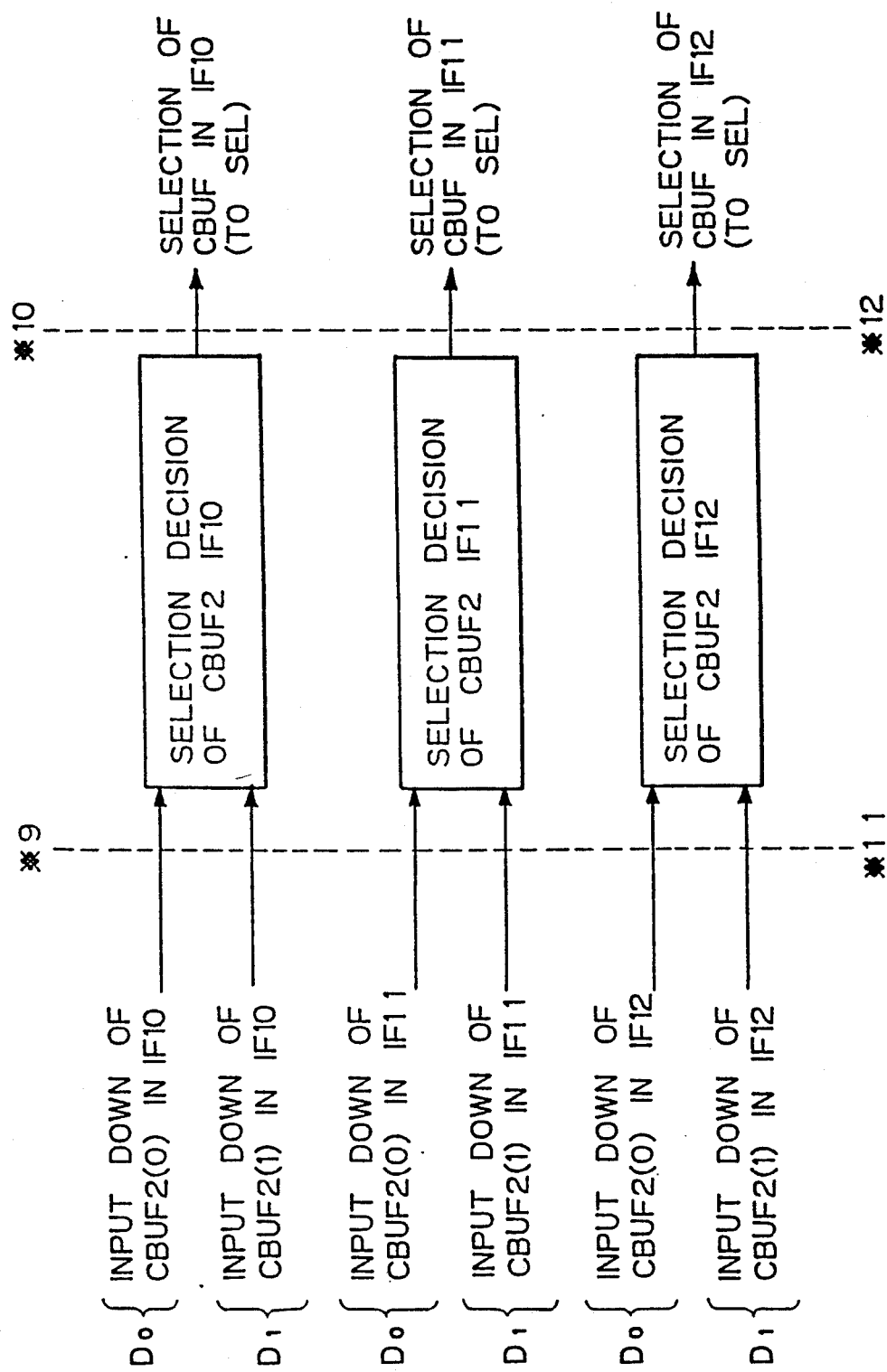

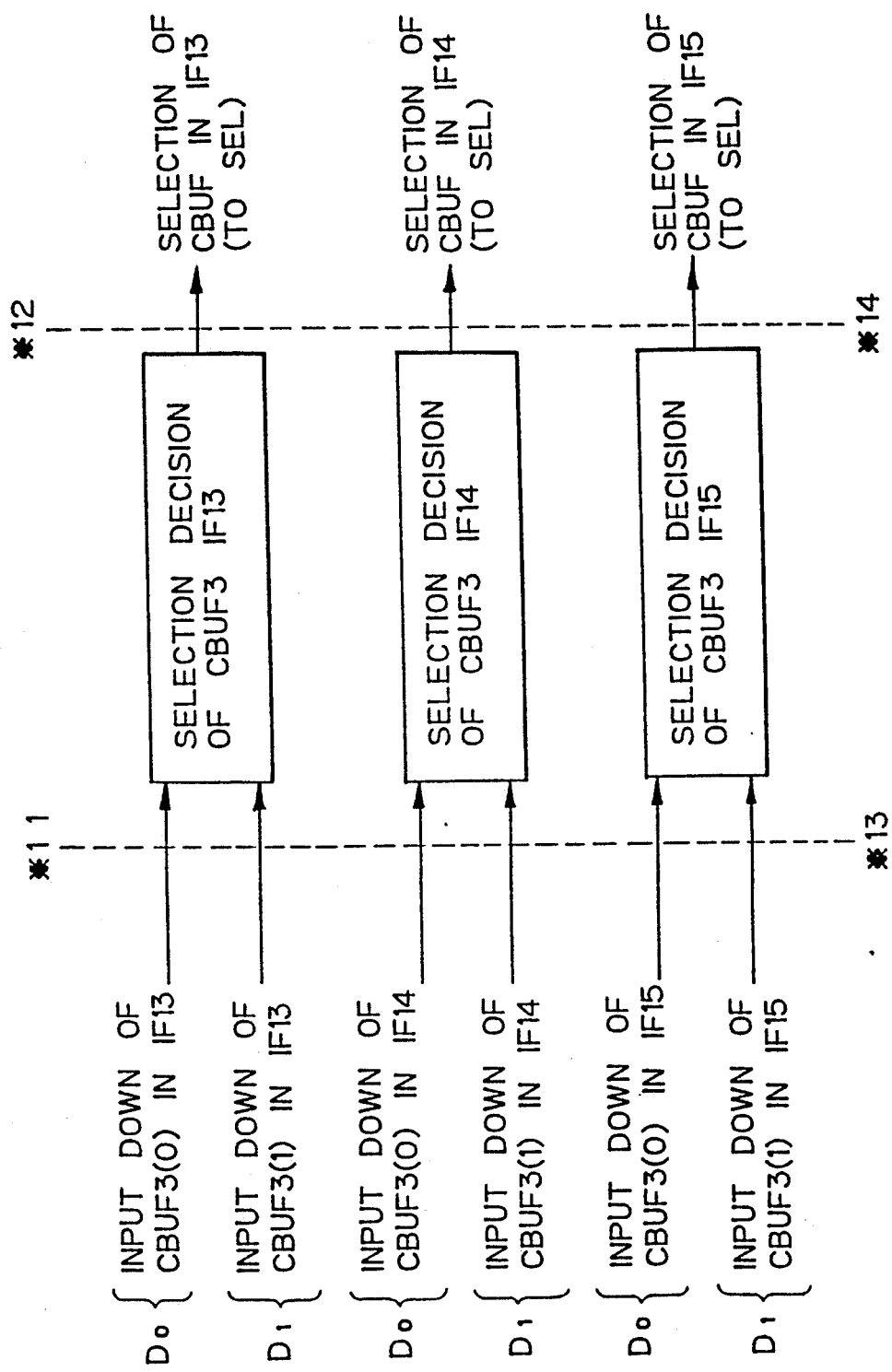

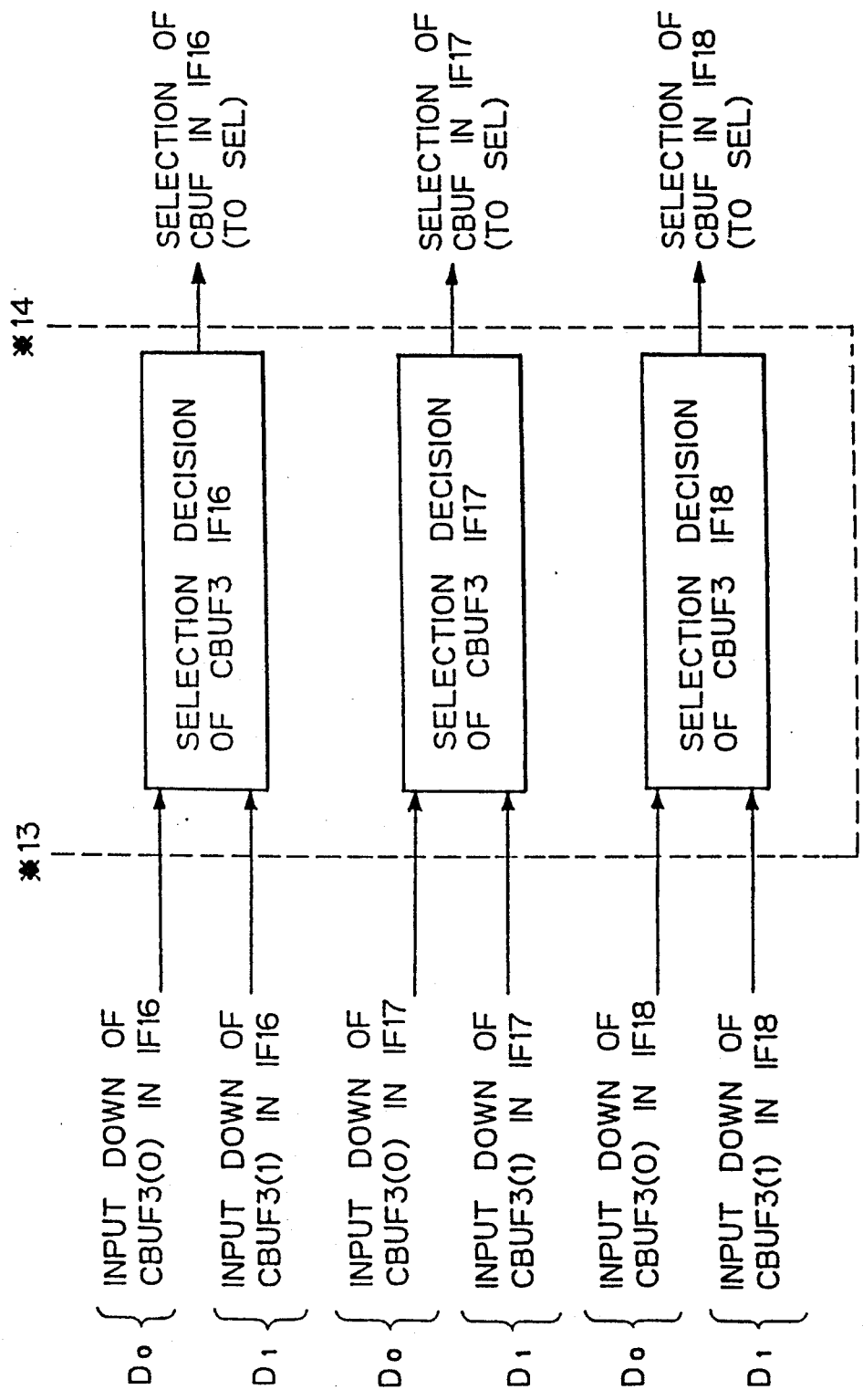

CLOCK SUPPLY APPARATUS

BACKGROUND OF THE INVENTION

1. Field of the Invention

The present invention relates to a clock supply apparatus, more particularly a clock supply apparatus which is provided for each of a plurality of offices performing dependent synchronization.

In general, multiplex transmission is used for interoffice transmission so that a large number of channels are transmitted together from one office to another. In this case, it is indispensable to attain synchronization with the other office. As this synchronization system, use has been made of the stuff multiplex system in the past.

Recently, however, there has been a tendency for use of the so-called dependent synchronization system. The present invention assumes the use of this system. In this dependent synchronization system, a master clock from a high precision oscillator installed in the master office is commonly received by all the slave offices. In synchronization with this master clock, transmission processing is performed in the respective slave offices. When doing this, a stuffing operation or a destuffing operation as in the case of the synchronization system according to the above-described stuff multiplex system becomes unnecessary.

2. Description of the Related Art

As will be explained later with reference to the drawings, in a conventional clock supply apparatus, a 0-system system clock and a 1-system system clock always coexist from an upstream side clock receiver unit 14 to the downstream transmission units 13. When the system clock of any of the systems is stopped, this situation is saved by the system clock of the other system without fail, so the reliability of supply of the clock has become extremely high.

However, if a fault occurs in the selection control part of the coexisting system clocks, the coexistence of the two systems of system clocks is of no use at all. That is, the reliability of the entire clock supply apparatus becomes far lower in comparison with the reliability obtained by the coexistence of the 0-system and 1-system system clocks. This is a problem.

SUMMARY OF THE INVENTION

Accordingly, in consideration of the above-described problem, the object of the present invention is to improve the reliability of the overall clock supply apparatus to almost the same extent as the reliability obtained by duplexing the system clocks.

To attain the above object, the present invention provides a clock supply apparatus wherein a single master clock is received at a clock receiver unit, the system clocks of the 0-system and 1-system are paired and distributed to the transmission units at the terminal ends via a plurality of duplexed clock supply routes, and a multistage clock selection unit is hierarchically inserted into each duplexed clock supply route, characterized in that a system-selection unit for controlling the selection of the 0-system or 1-system at the clock selection units is given a duplexed structure for the 0-system and 1-system and in that a system-switching command unit for instructing this system-selection is mounted.

BRIEF DESCRIPTION OF THE DRAWINGS

The above objects and features of the present invention will be more apparent from the following description of the preferred embodiments with reference to the accompanying drawings, wherein:

FIGS. 1A and 1B are views showing one example of a transmission line network according to the dependent synchronization system;

FIGS. 10A, 10B, 10C, 10D, 10E, 10F, 10G and 10H are views showing examples of the structure of the system-selection unit with respect to the model in FIG. 9.

DESCRIPTION OF THE PREFERRED EMBODIMENTS

Before describing the embodiments of the present invention, the prior art and the problems therein will be described with reference to the related figures.

Figure 1B:
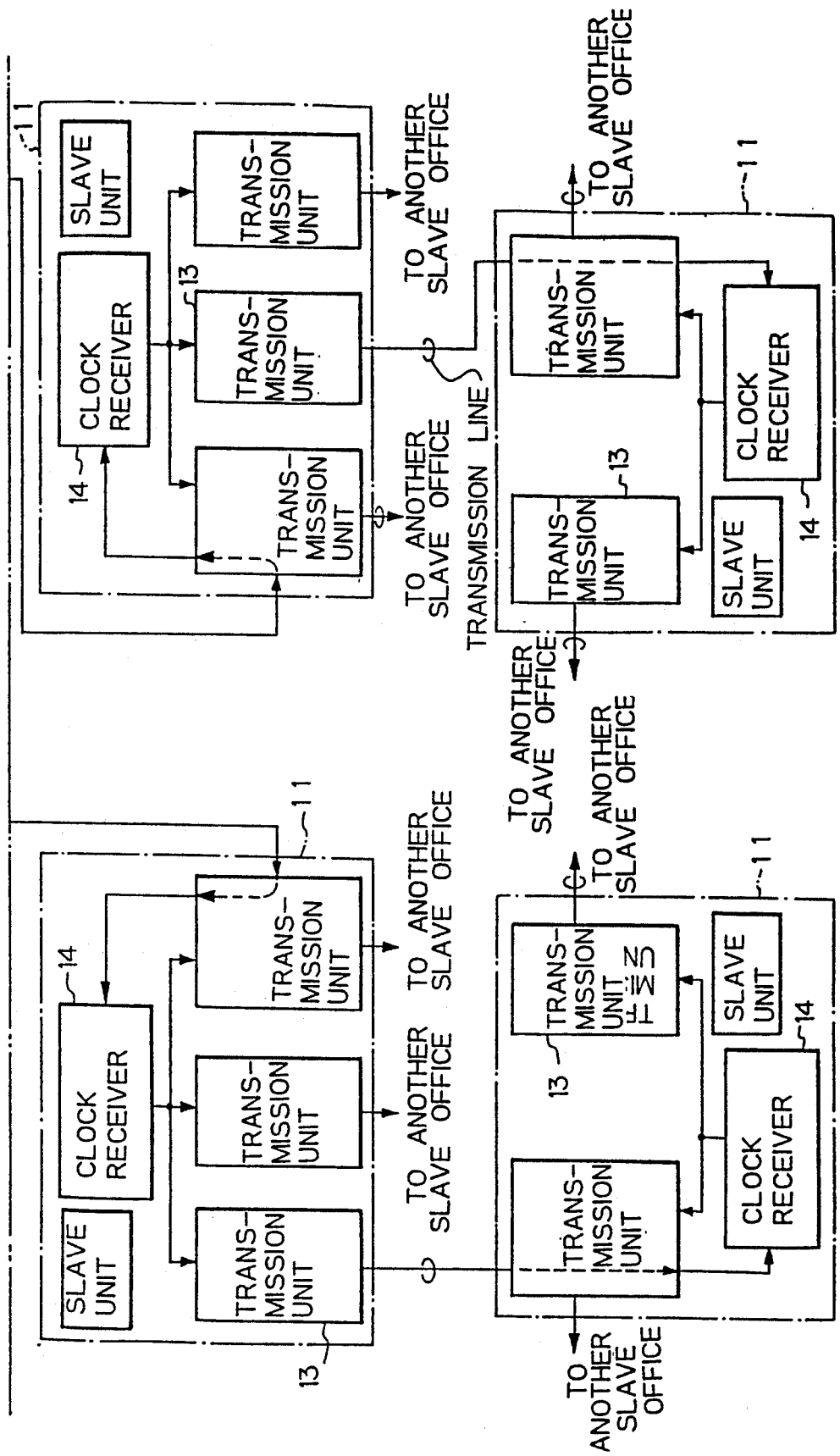

FIGS. 1A and 1B are views showing one example of a transmission line network according to the dependent synchronization system. In the figure, 10 is a master office, around which a large number of slave offices are connected in a mesh fashion to form a transmission line network.

The entire transmission line network is synchronized with a single master clock $CL_m$ supplied from the master office 10.

Transmission units 13 are provided in each of the offices. A master clock is input to a clock receiver unit 14 through a part of the transmission units. Note that, usually, a clock component obtained by multiplying the master clock is transmitted onto the transmission line.

Figure 2:
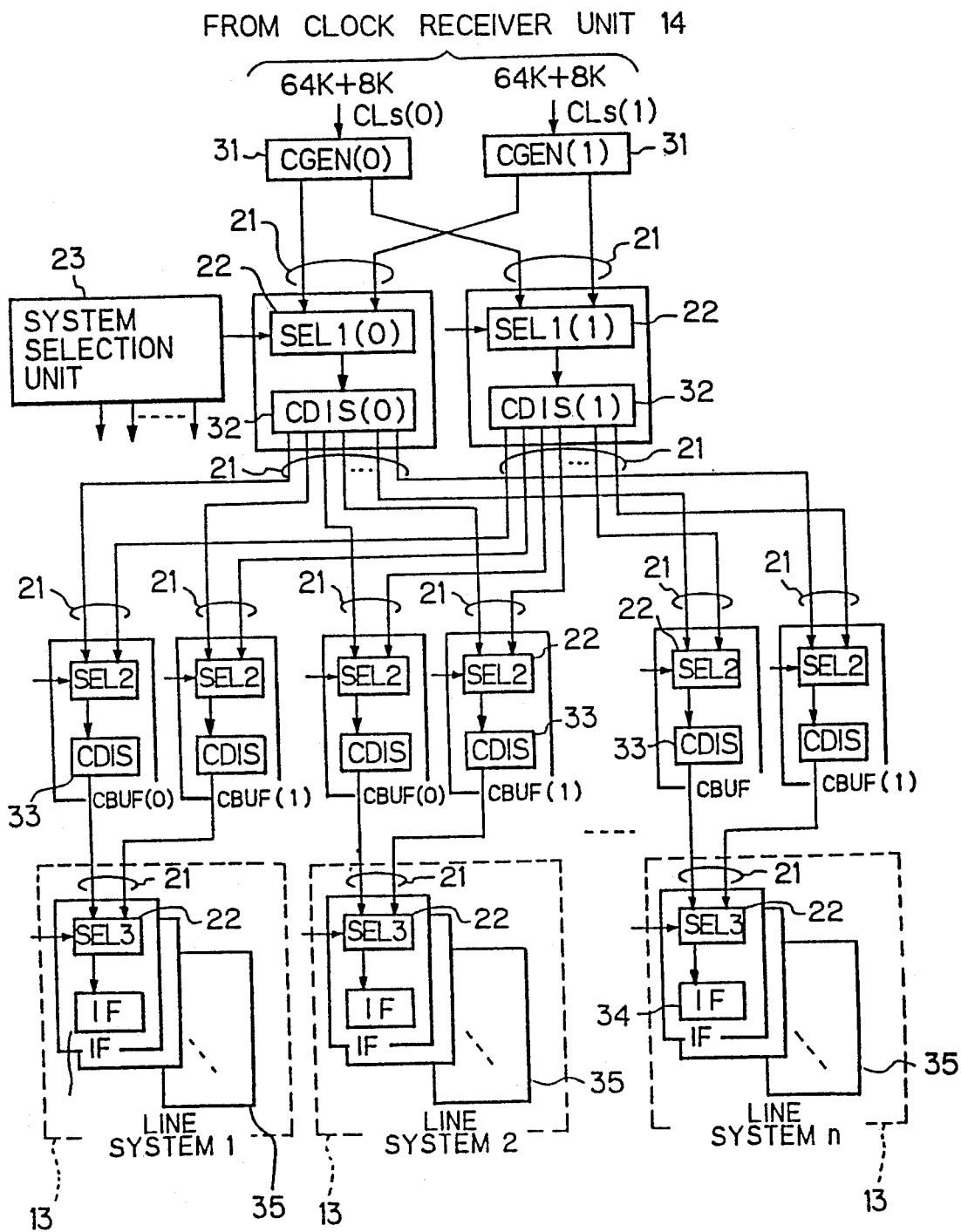
FIG. 2 is a view showing an example of a clock supply apparatus forming an assumption of the present invention.

FIG. 2 is a view showing an example of a clock supply apparatus forming an assumption of the present invention. The clock supply apparatus in each slave office 11 (FIG. 1) is provided with a plurality of duplexed clock supply routes 21 which receive a single master clock $Cl_m$ (FIG. 1) at the aforementioned clock receiver unit 14 to generate system clocks $CL_s(0)$ and $CL_s(1)$ duplexed to the 0-system and 1-system, pair the system clocks of the 0-system and 1-system, and supply the same to each of a plurality of line systems (line system 1, line system 2, ...); multistage clock selection units (SEL) 22 which are hierarchically inserted into the duplexed clock supply routes 21 from the clock receiver unit 14 to the transmission units 13 to perform alternate selection of 0-system and 1-system; and system-selection units 23 which control the alternate selection of the 0-system and 1-system with respect to the clock selection units 22.

The clock receiver unit 14 is provided with a frequency dividing (PLL) function and extracts 64 kHz and 8 kHz, the original master clock components, from a signal of, for example, 1.54 MHz or 6.312 MHz, obtained via the transmission line. A clock of 8 kHz is detected as a bipolar violation of the bipolar signal of 64 kHz and used for the frame synchronization.

Thus, system clocks $CL_s(0)$ and $CL_s(1)$ of the 0-system and 1-system which are completely synchronized with the single master clock $CL_m$ and duplexed are obtained. These system clocks are further paired for safety. These pairs are generated by the 0-system and 1-system clock pair generating units {CGEN(0), CGEN(1)} 31. When doing this, even when one of the two system clocks $CL_s(0)$ and $CL_s(1)$ stops, the situation can be saved by the other system clock.

The clock selection unit 22 consists of, in FIG. 2, three stages of clock selection units, that is, SEL1(0), SEL1(1); SEL2(0), SEL2(1); and SEL3(0), SEL3(1), and is hierarchically inserted into the duplexed clock supply routes from the clock receiver unit 14 to the respective transmission units 13. Each clock selection unit 22 selects one of the 0-system system clock or 1-system system clock. The determination of whether the 0-system is to be selected or 1-system is to be selected is made by the system-selection unit 23. In the figure, the control signal for this determination is input along the rightward arrow attached to the left side of each clock selection unit 22.

In the figure, the blocks 32 and 33 referenced by CDIS are clock distribution units and distribute the same clock to a plurality of systems. For example, the clock distribution unit 32 distributes the clock to a plurality of line systems (line system 1, line system 2, ... ), and the clock distribution unit 33 distributes the same to a plurality of interface cards 35. An interface unit (IF) 34 is mounted on each interface card 35. Note that, the interface cards are provided so as to correspond to various functions and have a multiplex/demultiplex function and optical/electrical and electrical/optical conversion functions.

In FIG. 2, the blocks positioned at an intermediate stage of the duplexed clock supply route 21, that is, CBUF(0) and CBUF(1), are called clock buffer units.

Among the above-described various constituent elements, the principal constituent elements of the clock supply apparatus according to the present invention are the clock receiver unit 14, the duplexed clock supply route 21, the clock selection unit 22, and the system-selection unit 23.

As mentioned earlier, in the above-mentioned conventional clock supply apparatus, the 0-system system clock and 1-system system clock always coexist from the upstream clock receiver unit 14 to the downstream transmission units 13. Even if the system clock of one of the systems stops, the situation can be saved by the system clock of the other system without fail, so the reliability of supply of the clock has become extremely high. However, there is a problem in that if a fault occurs in the selection control part of the coexisting system clocks, the coexistence of the two systems of system clocks is of no use at all. That is, the reliability of the overall clock supply apparatus becomes far lower in comparison with the reliability obtained by the coexistence of the 0-system and 1-system system clocks.

Figure 3:
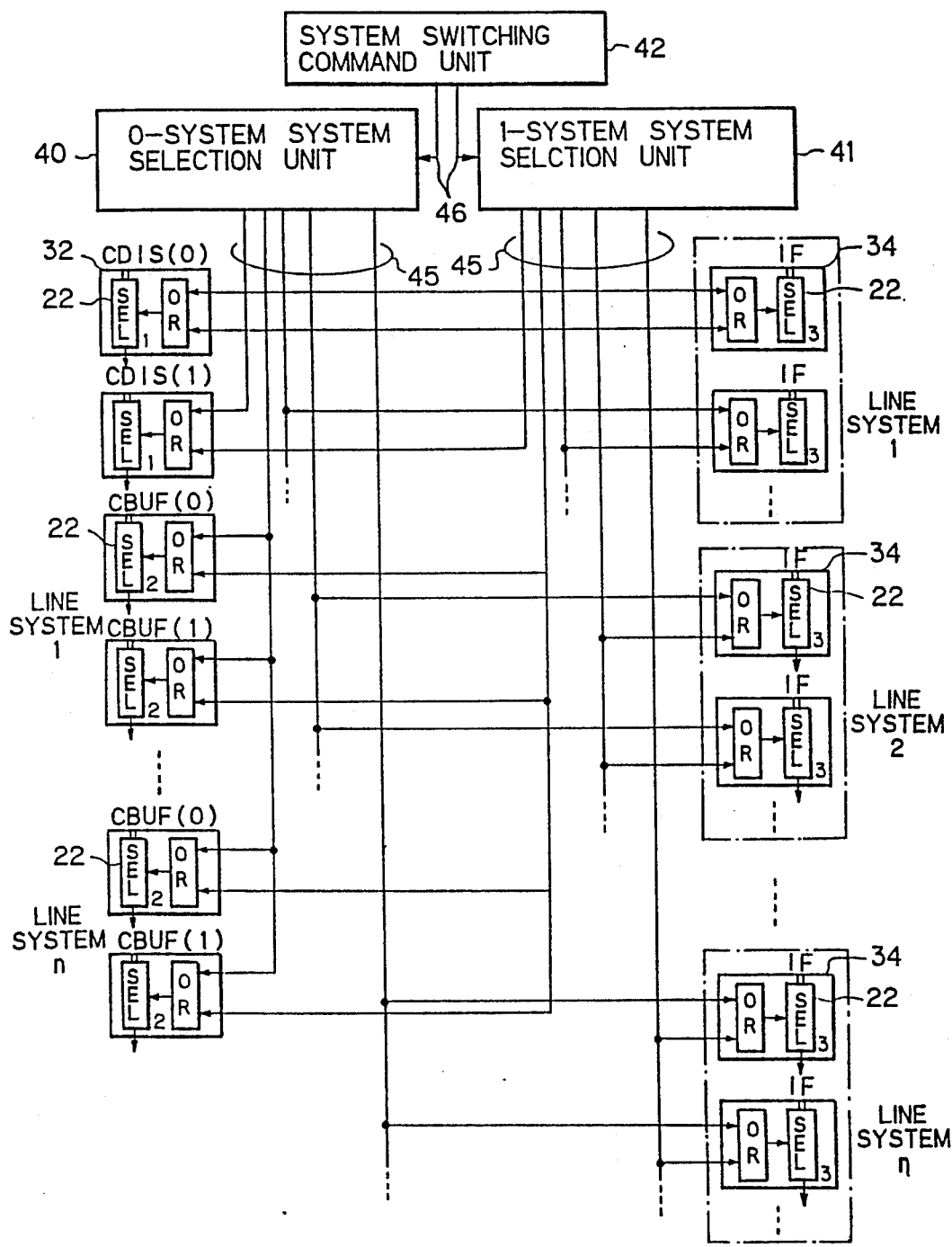
FIG. 3 is a view showing the basic structure of the present invention.

FIG. 3 is a view showing the basic structure of the present invention. In the figure, the blocks 40, 41, and 42 show the basic characteristic features of the present invention. Namely, the system-selection unit 23 shown in FIG. 1 is made to have a duplexed structure by the 0-system system-selection unit 40 and the 1-system system-selection unit 41. At the same time, a system switching command unit 42 instructing which of these system-selection units is to be selected is provided.

The selection control signals from the 0-system and 1-system system-selection units 40 and 41 are applied to the already mentioned clock selection units 22 via a selection control line 45. The selection control signals from the 0-system and 1-system selection control line 45 are ORed by the OR gates at the stage before the clock selection units 22. Each clock selection unit 22 consists of a selector (SEL) which alternately selects the aforementioned 0-system or 1-system system clock and outputs the same and the above-described OR gate which receives the command from the aforementioned 0-system or 1-system system-selection unit and controls which of 0-system and 1-system should be selected by the selector.

Note that, for the structure other than the three blocks 40, 41, and 42 indicated at the top in FIG. 3, the structure shown in FIG. 2 is utilized as is.

Since the system-selection unit is duplexed for the 0-system (40) and 1-system (41), a functional part for issuing a command as to which of these 0-system (40) and 1-system (41) is to be used as an active part and which of them is to be used as a stand-by part further becomes necessary. This is the system-switching command unit 42, which is changed over by the system switching line 46.

Duplexing is originally performed for the system clock, and the reliability is high. According to the present invention, the system-selection part of the duplexed system clock is also duplexed, and therefore the reliability of the entire clock supply apparatus is improved to the same extent as the system clock.

Figure 4:
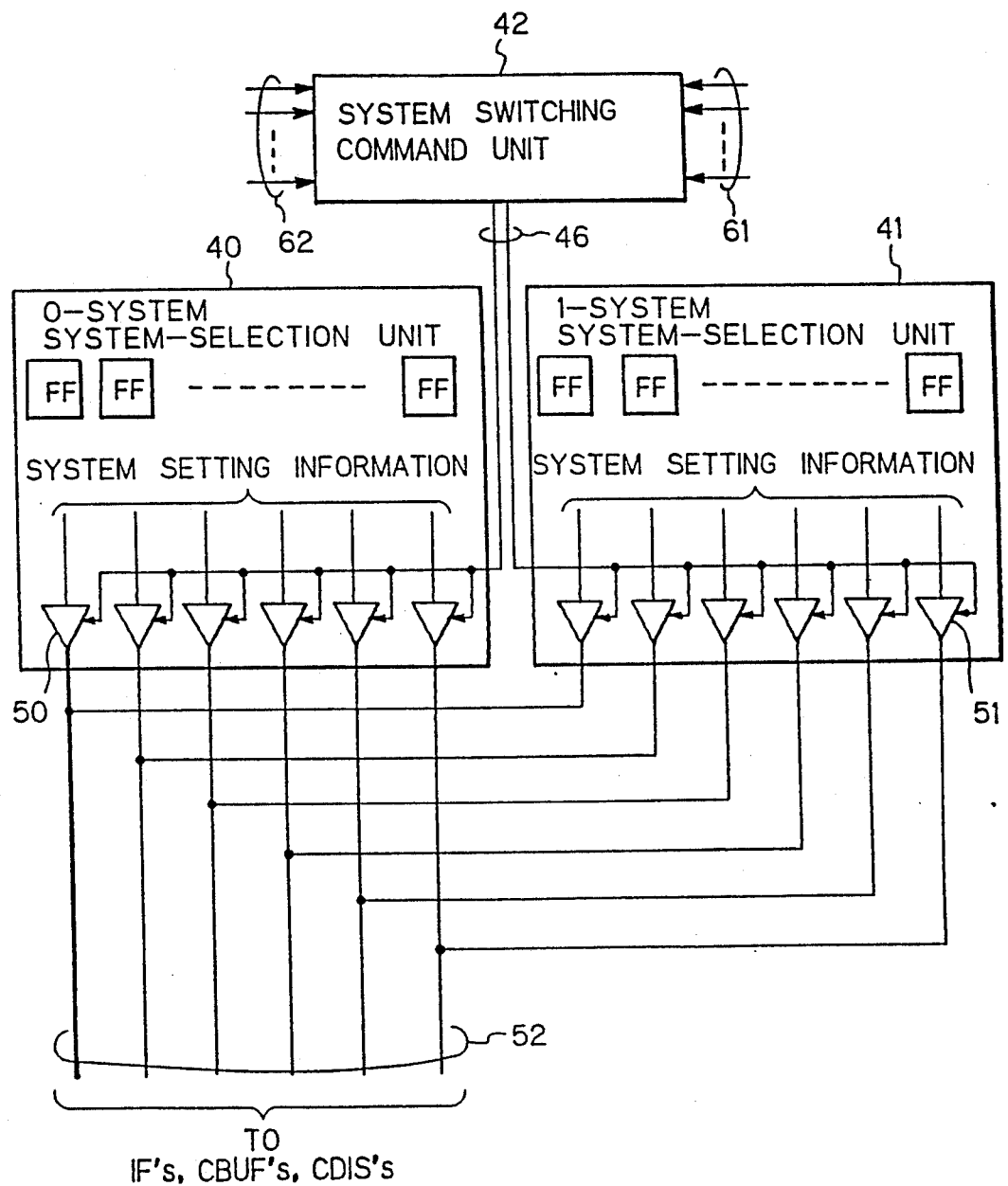
FIG. 4 is a view showing an example of the structure of an output sides of the 0-system and 1-system system-selection units.

FIG. 4 is a view showing an example of the structure of the output side of the 0-system and 1-system system-selection units. The 0-system and 1-system system-selection units 40 and 41 output a system setting information instructing in which system the clock selection units 22 in the already mentioned IF, CBUF, and CDIS should be set in the form of a logic "1" or "0". This output form of FIG. 3 is mutually independent between the 0-system and 1-system, but in FIG. 4 the two systems are made together, that is, the wired OR of the outputs of the two systems is taken and combined on a common system-selection line 52. By doing this, the OR gates individually provided before the selection units 22, as shown in FIG. 3, become unnecessary.

Note, a group of 0-system gates 50 and a group of the 1-system gates 51 for controlling the transmission/non-transmission of the system-selection signal (system setting information) become necessary at the output stages of the 0-system and 1-system system-selection units 40 and 41. These gates 50 and 51 are mutually complementarily opened or closed by a system-switching signal from the system-switching command unit 42. That is, when the 0-system gate 50 side is open (or closed), the 1-system gate 51 side is closed (or open). Note that, these gates can be constituted by a tri-state gate.

Figure 5:
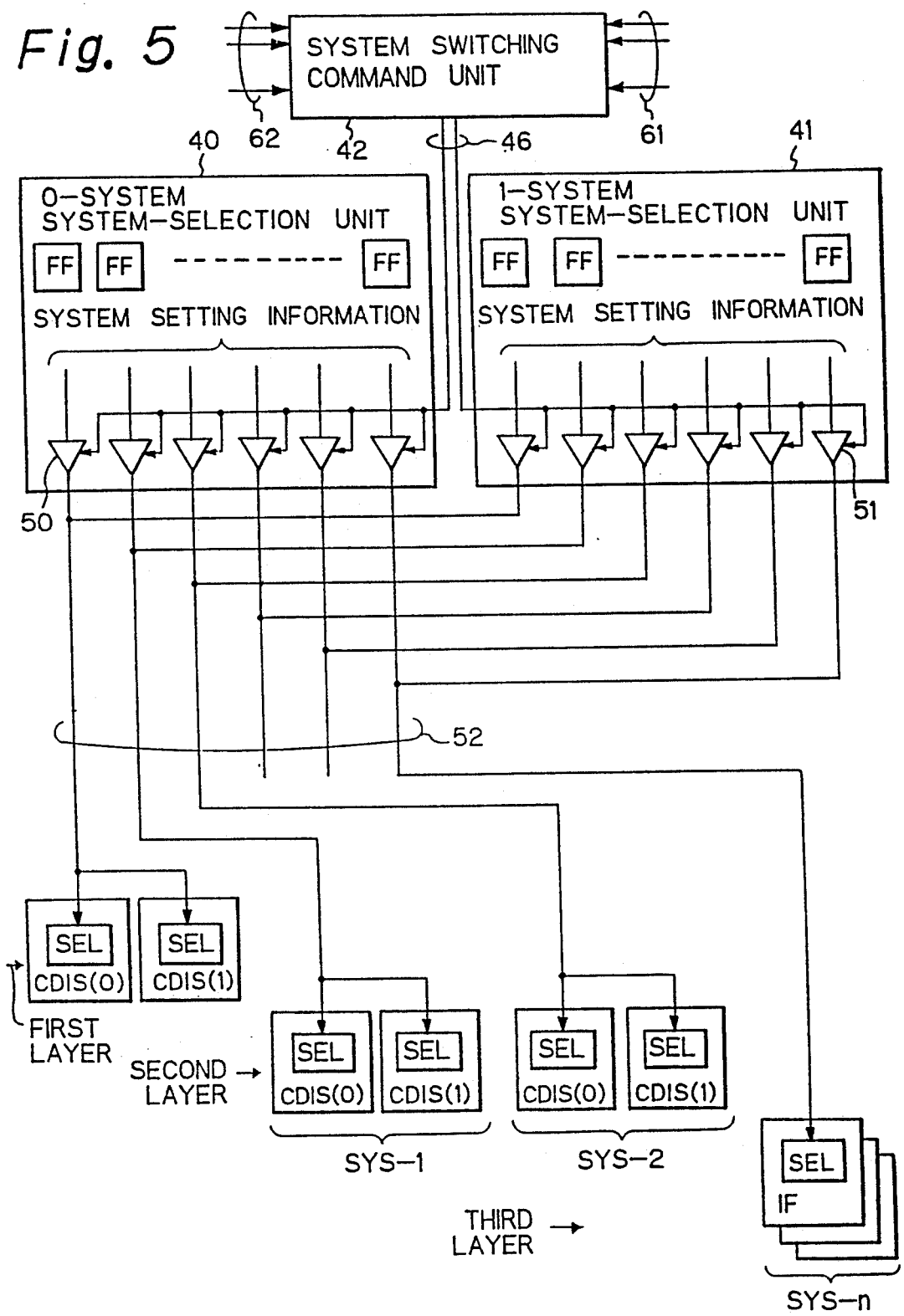
FIG. 5 is a view showing the structure of an apparatus corresponding to FIG. 3 in a case where the OR gates in FIG. 3 are eliminated and the system-selection units of FIG. 4 are used.

FIG. 5 is a view showing the structure of an apparatus corresponding to FIG. 3 in a case where the OR gates of FIG. 3 are eliminated, and the system-selection units 40 and 41 in FIG. 4 are used in place of them. Note that, there are "n" pairs for the pairs of CBUF(0) and CBUF(1) in the diagram corresponding to the respective line systems (line system 1, line system 2, ..., line system n), but only two pairs are shown in the diagram. There are n pairs corresponding to the respective line systems also for the pairs of IF(0) and IF(1), but only one pair is shown in the diagram. The 0-system gate 50 consists of a plurality of gates provided corresponding to each layer of multiple layers and to each of the line systems. Also, the 1-system gate 51 similarly consists of a plurality of gates provided corresponding to each layer of the aforementioned multiple layers and to each of the line systems.

Also, the aforementioned 0-system of plurality of gates 50 and the aforementioned 1-system of plurality of gates 51 are simultaneously changed over together.

The above-mentioned system switching command unit 42 is most suitably constituted so as to execute the switching of systems when a certain abnormality occurs in the clock supply apparatus. An example of the structure thereof will be explained below.

Figure 6:
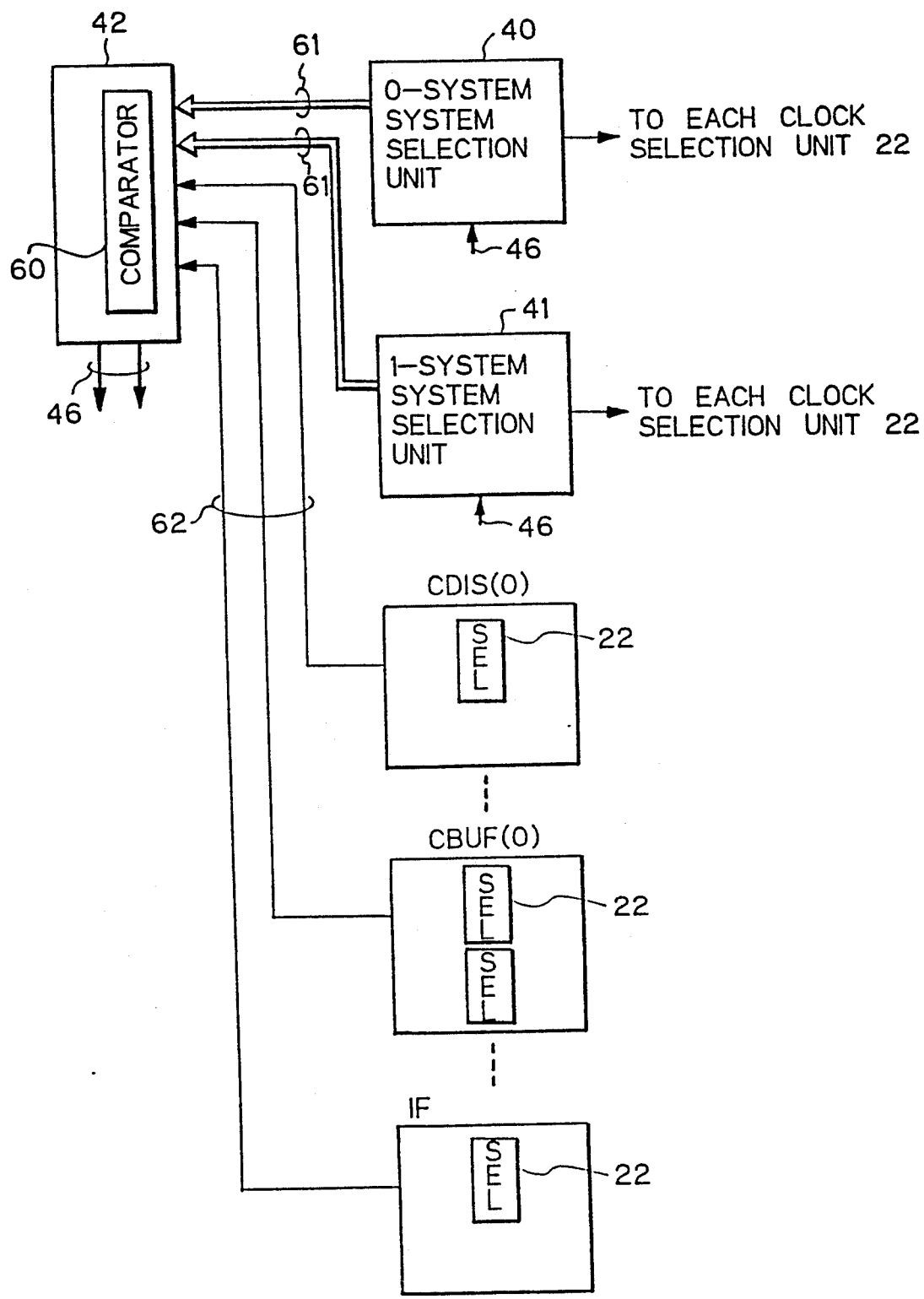
FIG. 6 is a view showing a structural example of a system-switching command unit.

FIG. 6 is a diagram showing one structural example of a system-switching command unit. According to the structural example of the figure, the system-switching command unit 42 is provided with a comparator means 60 which receives as its input a system setting information set by each of the 1-system and 0-system system-selection units 40 and 41 and the system-selection information selected by the respective clock selection units 22, and detects coincidence/noncoincidence between the information. When the result of that comparison is noncoincidence, the 0-system or 1-system system-selection unit (40 or 41) of the 0-system or 1-system acting as the active system is changed over to the stand-by system, and the other system-selection unit is changed over to the active system.

The above-described system setting information is collected at the system-switching command unit 42 via the system setting information line 61. Further, the above-described system-selection information is collected at the system-switching command unit 42 via the system-selection information line 62. This collection can be carried out by high-speed polling by the command unit 42.

The above-described system setting information and the above-described respective system-selection information originally should completely coincide. If they do not coincide, this is because a certain abnormality has occurred in the clock supply apparatus. Therefore, so as to always monitor the state of the coincidence, a comparator 60 is provided.

Figure 7:
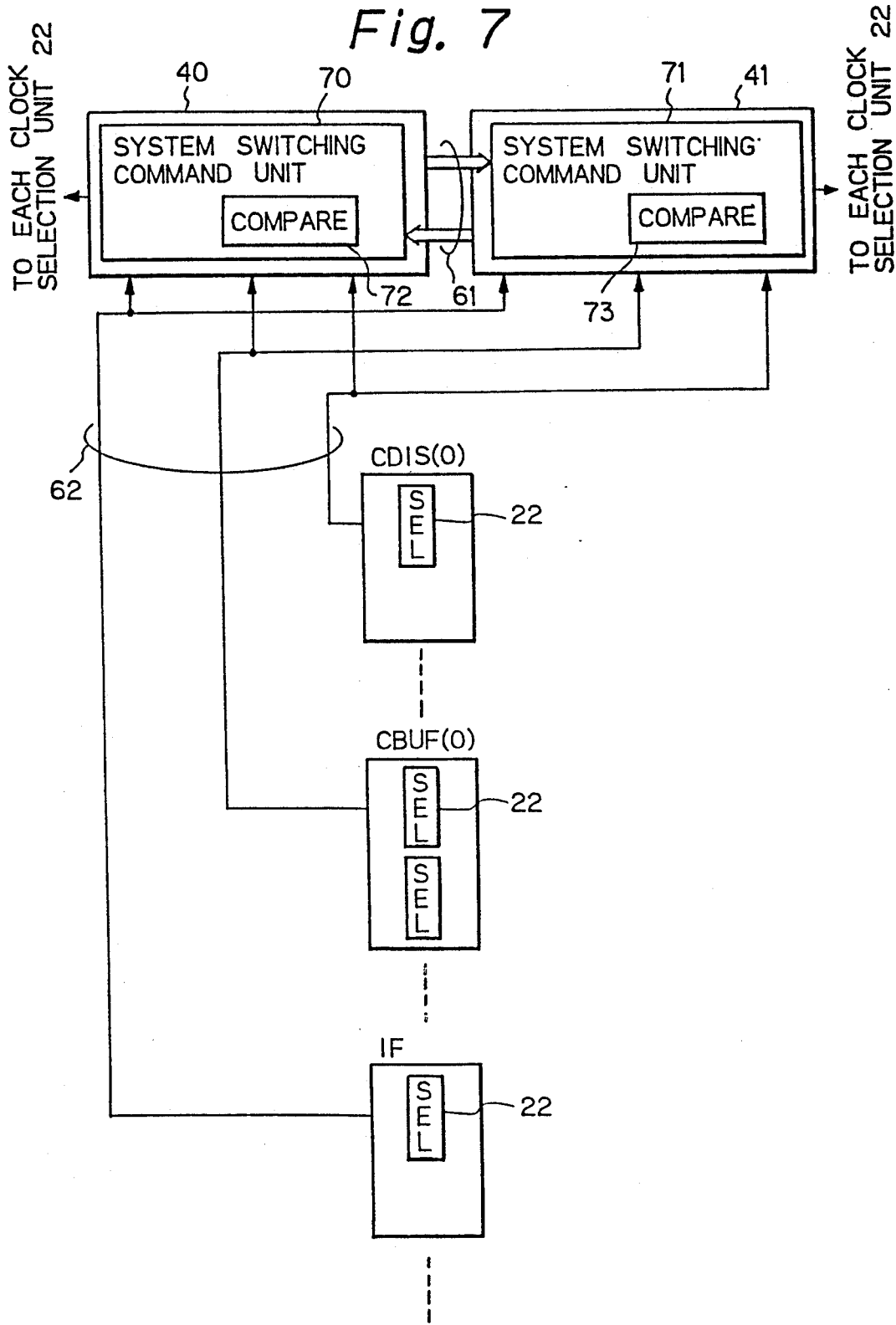
FIG. 7 is a view showing another structural example of a system-switching command unit.

FIG. 7 is a diagram showing another structural example of the system-switching command unit. According to the structural example of the figure, the system-switching command unit 42 is formed as a 0-system system-switching command unit 70 and a 1-system system-switching command unit 71 in the 0-system system-selection unit 40 and the 1-system system-selection unit 41, respectively. These system-switching command units 70 and 71 mutually compare the coincidence/noncoincidence of the system setting information and system-selection information by the comparators 72 and 73.

So as to mutually carry the other system setting information, a system setting information line 61 is provided. Also, the system-selection information from the clock selection units (SEL) 22 is collected at the 0-system and 1-system system-switching command units 70 and 71 via the system-selection information lines 62.

According to the structural example of FIG. 7, among the large number of panels constituting the apparatus, the number of panels constituting the system-switching command units (indicated by reference numeral 42 in FIG. 3 and FIG. 4) can be reduced.

In this structural example of FIG. 7, when the 0-system system-selection unit 40 is active, the 1-system system-selection unit 41 is on stand-by, and therefore the switching command unit 41 in this 1-system system-selection unit 41 is operated as the above-mentioned system-switching command unit 42. Similarly, when the 1-system system-selection unit 41 is active, the 0-system system-selection unit 41 is on stand-by, and therefore the switching command unit 40 in this 0-system system-selection unit 40 is operated as the above-mentioned system-switching command unit 42.

Figure 8:
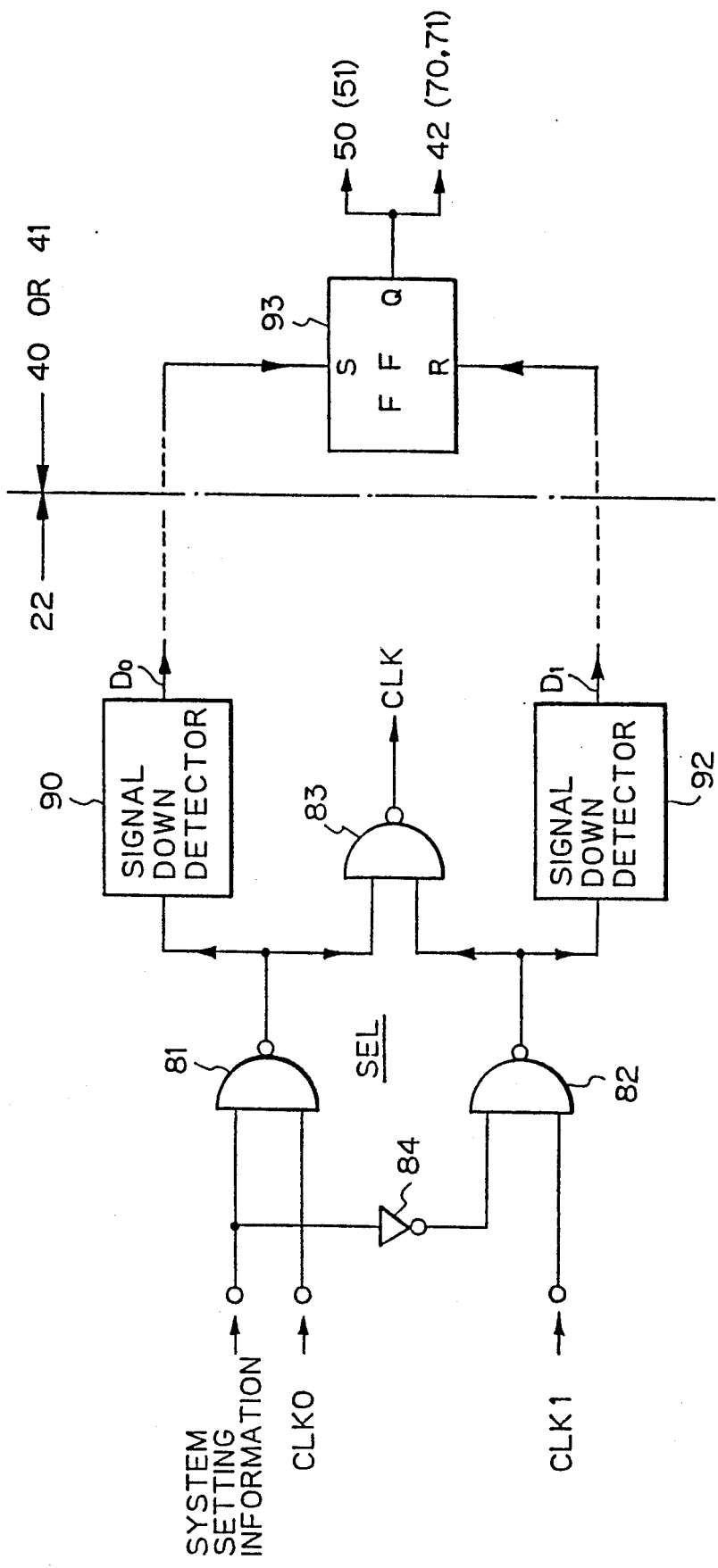
FIG. 8 is a view showing a detailed example of a clock selection unit.

FIG. 8 is a diagram showing a detailed example of the clock selection unit 22. The aforementioned multistage clock selection unit includes a selector (SEL) for alternately selecting the aforementioned 0-system and 1-system system clocks based on the command from the aforementioned 0-system or 1-system system-selection unit and outputting the same. A 0-system signal down detector 90 and a 1-system signal down detector 91 are provided in the 0-system input and 1-system input of the selectors. Further, RS-flip-flops (FF) 93 (refer to FF in FIG. 4 and FIG. 5) are provided in the aforementioned 0-system system-selection unit 40 and the aforementioned 1-system system-selection unit 41, respectively, corresponding to the aforementioned plurality of gates 50 and 51. The outputs from the aforementioned 0-system signal down detector 90 and the aforementioned 1-system signal down detector 91 are applied as the system-selection information to a set input S and a reset input R of the RS-flip-flops 93, respectively.

The signal down detectors (90, 91) output "L" (low) when the system clock (CLK) normally appears and output "H" when the signal is stopped. Accordingly, the flip-flop 93 outputs "L" in the normal mode and outputs "H" in the abnormal mode.

The aforementioned selector SEL consists of a first logic gate (NAND) 81 and a second logic gate (NAND) 82, which receive as their inputs the aforementioned 0-system system clock CLK0 and 1-system system clock CLK1 respectively and complementarily become conductive and nonconductive (by an inverter 84) according to the aforementioned system setting information, and a third logic gate (NAND) 83 which receives as its inputs the outputs of the first and second logic gates 81 and 82 and outputs the 0-system or 1-system system clock (CLK0 or CLK1). The aforementioned 0-system and 1-system signal down detectors 90 and 91 are connected to outputs of the aforementioned first and second logic gates 81 and 82, respectively.

Finally, a concrete example of the system-selection units 40 and 41 (both have the same structure) will be shown. This concrete example uses a certain model (FIG. 9) as the base.

Figure 9:
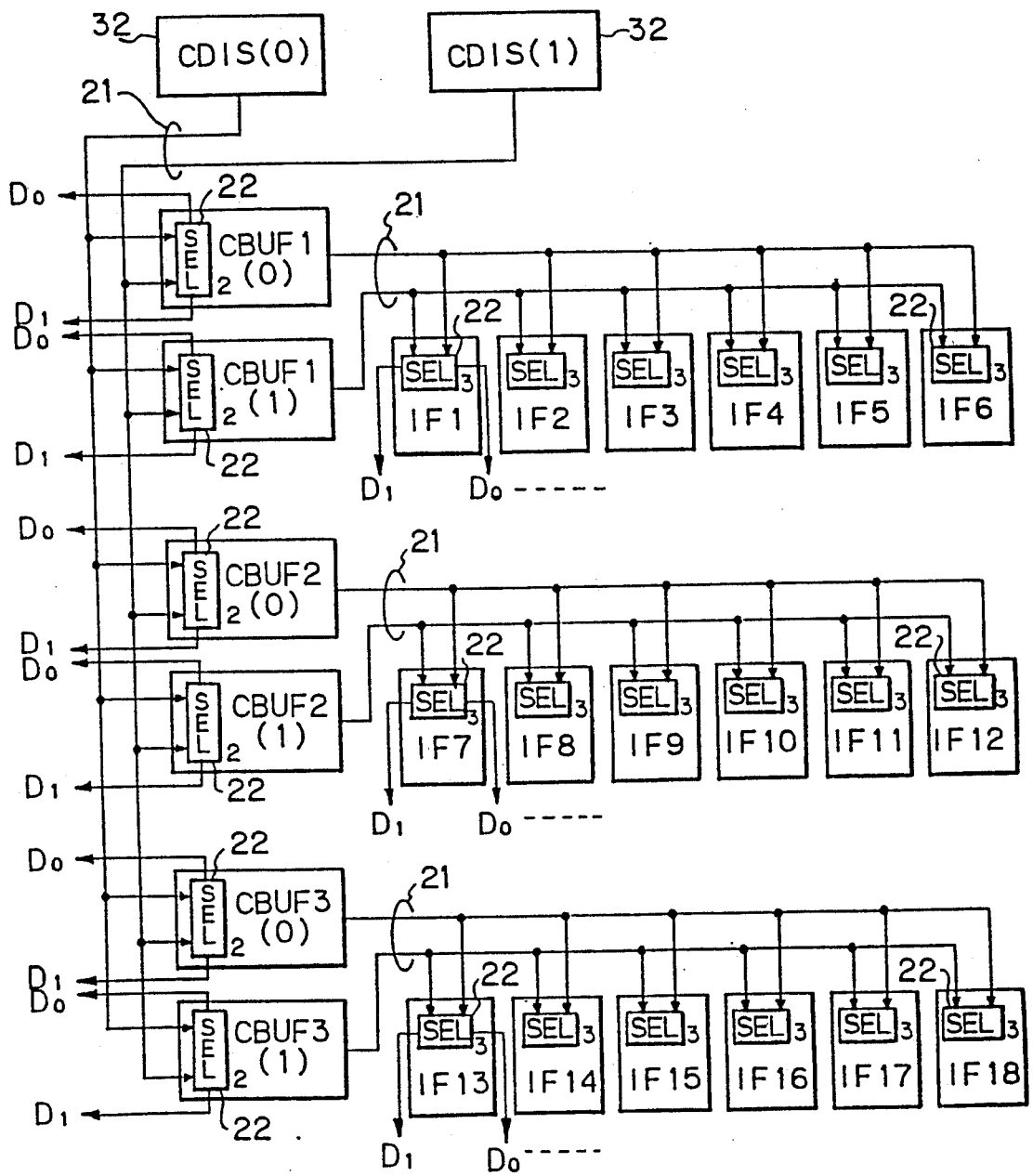
FIG. 9 is a view showing a model of a clock supply apparatus.
Figure 10A:
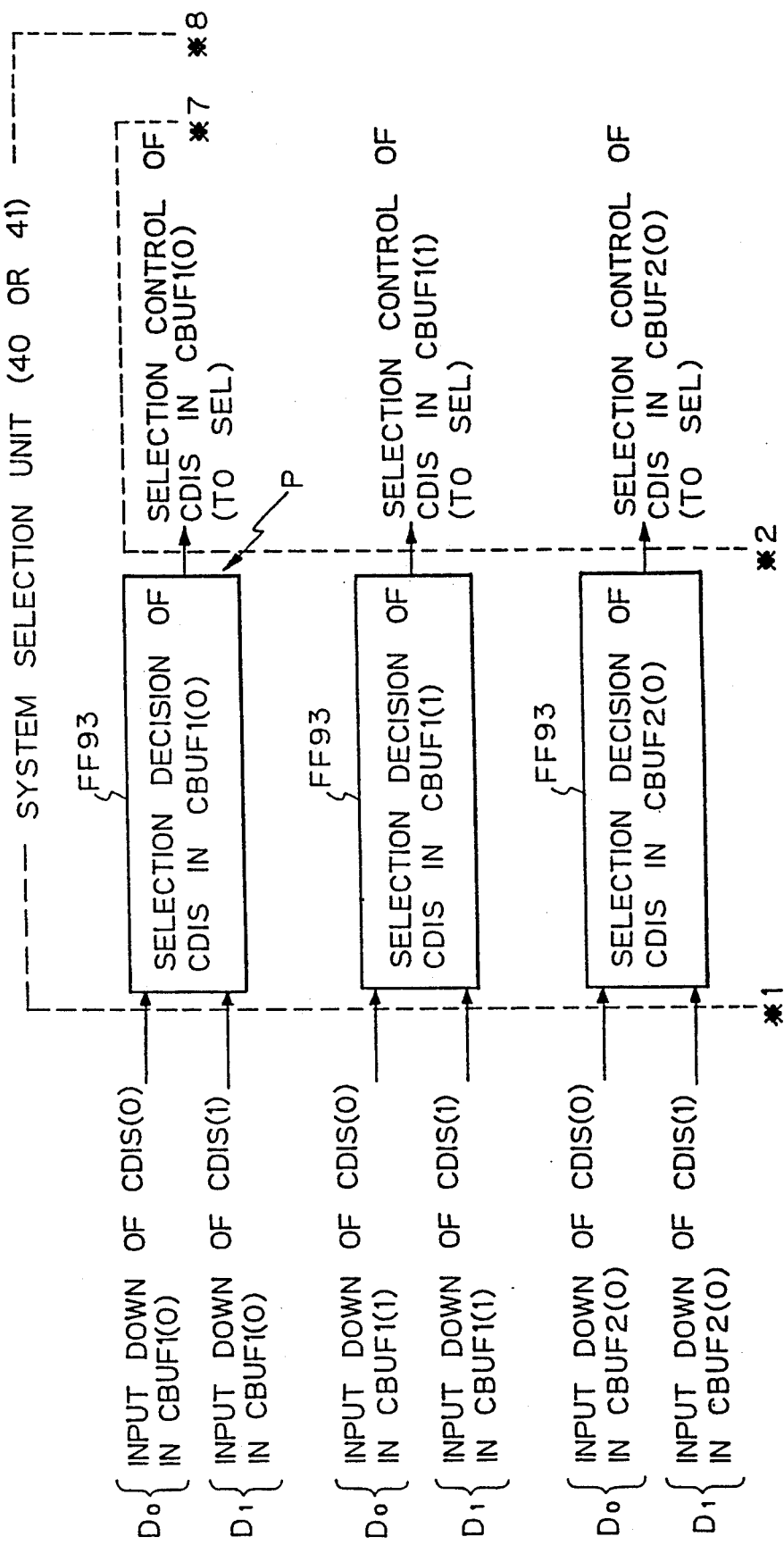
Figure 10D:
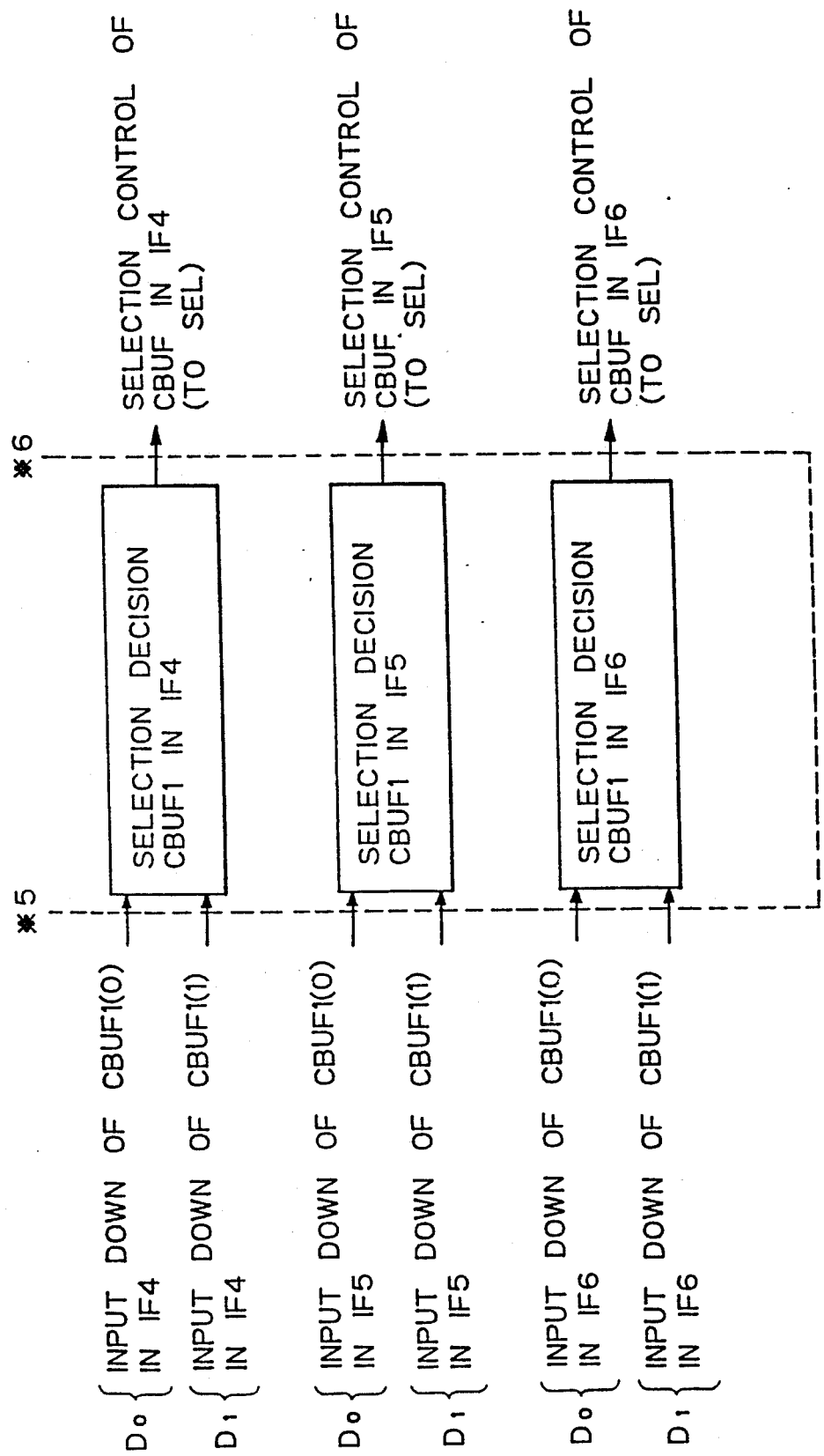

FIG. 9 is a view showing one model of the clock supply apparatus. A concrete example using this model will be shown in FIGS. 10A to 10H. Note that, $D_0$ and $D_1$ shown in FIG. 9 are the same as $D_0$ and $D_1$ shown in FIG. 8. Only one set of $D_0$ and $D_1$ are shown for IF.

FIGS. 10A to 10H are views showing the structural example of the system-selection unit with respect to the model of FIG. 9. These constitute one structure.

In FIG. 9, the meaning of CDIS, CBUF, SEL, and IF and the meaning of the reference numerals 21, 22, and 32 are as already explained with reference to FIG. 2.

FIGS. 10A to 10H show a detailed example of the 0-system or 1-system system-selection unit (both have the same structure). When taking the column of P on the left top in FIG. 10A as an example with reference to FIG. 9, it is decided which of CDIS(0) or CDIS(1) existing on the upstream side of the 0-system CBUF1 should be selected by seeing:

<1> whether or not the input from the CDIS(0) 32 existing on the upstream side of the CBUF1 of the 0-system has gone down, <2> whether or not the input from the CDIS(1) 32 existing on the upstream side of the CBUF1 of the 0-system has gone down, and <3> the clock selection unit (SEL) is controlled so as to select either of the system CDIS(0) or CDIS(1) based on the result of that decision.

The criteria for this decision is shown in the following decision table:

TABLE

| Selection control | | 1-system input down | |
|---|---|---|---|
| | | Normal state | Down state |
| 0-system input down | Normal state | Previous state is retained | 0-system is selected |
| | Down state | 1-system is selected | 0-system is selected |

Namely, two matters of whether or not the input of the 0-system is down (normal or down state) and whether or not the input of the 1-system is down (normal or down state) are plotted in the columns and rows to form a matrix, and the result of decision is set in each matrix. For example, when the input of 0-system is in the down state and the input of the 1-system is normal, the 1-system is selected.

As explained above, according to the present invention, the reliability of the system-selection control of the system clock can be enhanced to almost the same extent as the reliability of the duplexed system clock, and the reliability of the clock supply apparatus is strikingly improved.

I claim:

1. A clock supply apparatus provided with a plurality of duplexed clock supply routes which receive a single master clock at a clock receiver unit, generate a system clock duplexed to a 0-system and a 1-system, pair said 0-system and 1-system system clocks, and supply the same to each of the transmission units of a plurality of line systems; multistage clock selection units which are hierarchically inserted into said duplexed clock supply routes from the aforementioned clock receiver unit to said transmission units and perform the aforementioned alternate selection of the 0-system or 1-system; and system-selection units which control the aforementioned alternate selection of the 0-system or 1-system with respect to said clock selection units, wherein the aforementioned system-selection unit is duplexed to a 0-system system-selection unit and a 1-system system-selection unit and, at the same time, a system switching command unit instructing which of these system-selection units is to be selected is provided.

2. A clock supply apparatus as set forth in claim 1, wherein each of the aforementioned multistage clock selection units consists of a selector (SEL) which alternately selects the aforementioned 0-system or 1-system system clock and outputs the same; and an OR gate which receives the aforementioned command from the aforementioned 0-system or 1-system system-selection unit and controls which of the 0-system or 1-system should be selected by said selector.

3. A clock supply apparatus as set forth in claim 1, wherein a 0-system gate and a 1-system gate which are gates for controlling the transmission/nontransmission of the system-selection signal and mutually complementarily open or closed are provided at the output stages of the aforementioned 0-system system-selection unit and the aforementioned 1-system system-selection unit and wherein the wired OR of the outputs of said 0-system and 1-system gates is taken and applied to the aforementioned clock selection units.

4. A clock supply apparatus as set forth in claim 2, wherein each of the aforementioned 0-system gate and 1-system gate consists of a tristate gate.

5. A clock supply apparatus as set forth in claim 1, wherein the aforementioned system-switching command unit provides a comparator which receives as its inputs a system setting information set by each of the aforementioned 1-system and 0-system system-selection units and system-selection information selected by the aforementioned clock selection units and detects coincidence/noncoincidence between these information, and, when the result of that comparison is noncoincidence, the aforementioned 0-system or 1-system system-selection unit between the 0-system and 1-system which has become the active system is changed over to the stand-by system, and the other system-selection unit is changed over to the active system.

6. A clock supply apparatus as set forth in claim 3, wherein the aforementioned system switching command unit provides a comparator which receives as its inputs a system setting information set by each of the aforementioned 1-system and 0-system system-selection units and system-selection information selected by the aforementioned clock selection units and detects coincidence/noncoincidence between these information, and when the result of that comparison is noncoincidence, the aforementioned 0-system or 1-system system-selection unit between the 0-system and 1-system which has become the active system is changed over to the stand-by system, and the other system-selection unit is changed over to the active system.

7. A clock supply apparatus as set forth in claim 6, wherein the aforementioned system-switching command units are formed as a 0-system system switching command unit and a 1-system system switching command unit in the aforementioned 0-system system-selection unit and the aforementioned 1-system system-selection unit, respectively, and these system-switching command units mutually compare the coincidence/noncoincidence of the aforementioned system setting information and the aforementioned system-selection information at the comparator.

8. A clock supply apparatus as set forth in claim 6, wherein the aforementioned 0-system gate consists of a plurality of gates which are provided corresponding to each of the layers of the aforementioned multistage layers and to each of the line systems, and also the aforementioned 1-system gate similarly consists of a plurality of gates which are provided corresponding to each of the layers of the aforementioned multistage layers and to each of the line systems.

9. A clock supply apparatus as set forth in claim 8, wherein the aforementioned plurality of 0-system gates and the aforementioned plurality of 1-system gates are simultaneously changed over together.

10. A clock supply apparatus as set forth in claim 8, wherein each of the aforementioned multistage clock selection units includes a selector (SEL) for alternately selecting the aforementioned 0-system or 1-system system clock based on the aforementioned command from the aforementioned 0-system or 1-system system-selection unit; a 0-system signal down detector and a 1-system signal down detector are provided in the 0-system input and 1-system input of said selectors, respectively; and further RS-flip-flops are provided in the aforementioned 0-system system-selection unit and the aforementioned 1-system systems-selection unit respectively corresponding to the aforementioned plurality of gates; and outputs from the aforementioned 0-system signal down detector and the aforementioned 1-system signal down detector are applied as the aforementioned system-selection information to set inputs and reset inputs of said RS-flip-flops.

11. A clock supply apparatus as set forth in claim 10, wherein the aforementioned selectors each consists of a first logic gate and a second logic gate which receive as their inputs the aforementioned 0-system system clock and 1-system system clock and complementarily become conductive or nonconductive according to the aforementioned system setting information; and a third logic gate which receives as its inputs the outputs of said first and second logic gates and outputs said 0-system or 1-system system clock; and the aforementioned 0-system and 1-system signal down detectors are connected to the outputs of the aforementioned first and second logic gates, respectively.

* * * * *